(12) United States Patent
Powell

(10) Patent No.: US 6,178,476 B1
(45) Date of Patent: Jan. 23, 2001

(54) DATA COMMUNICATION INTERFACE INCLUDING AN INTEGRATED DATA PROCESSOR AND SERIAL MEMORY DEVICE

(75) Inventor: Ernest W. Powell, Sugar Land, TX (US)

(73) Assignee: Texas Instruments Incorporated, Dallas, TX (US)

(*) Notice: Under 35 U.S.C. 154(b), the term of this patent shall be extended for 0 days.

(21) Appl. No.: 09/002,638

(22) Filed: Jan. 5, 1998

Related U.S. Application Data

(60) Provisional application No. 60/035,762, filed on Jan. 6, 1997.

(51) Int. Cl.[7] ................. G06F 13/38; H04L 29/06; H04M 11/00
(52) U.S. Cl. ............................. 710/128; 341/126
(58) Field of Search ................. 710/100, 101, 710/3, 128, 129, 131, 105; 709/219, 238; 360/32; 370/420, 278, 360, 386; 341/100, 101, 110, 126; 712/1, 35, 36; 381/59, 26, 28; 455/6.3, 39; 704/201, 212

(56) References Cited

U.S. PATENT DOCUMENTS

| | | | |
|---|---|---|---|
| 4,264,954 | * | 4/1981 | Briggs et al. ................... 710/4 |
| 4,516,201 | | 5/1985 | Warren et al. ................. 364/200 |
| 4,713,757 | * | 12/1987 | Davidson et al. ............ 364/131 |
| 4,728,930 | * | 3/1988 | Grote et al. .................. 341/101 |
| 4,811,007 | * | 3/1989 | Schreiber .................... 345/510 |
| 5,018,188 | * | 5/1991 | Kowalski et al. ............. 455/569 |
| 5,020,020 | * | 5/1991 | Pomfret et al. ............... 709/235 |
| 5,333,199 | * | 7/1994 | Kuwasaki ..................... 381/1 |
| 5,361,374 | | 11/1994 | Sasaki et al. ................. 395/800 |
| 5,537,646 | * | 7/1996 | Buck et al. ................... 713/600 |
| 5,754,803 | * | 5/1998 | Regis ........................... 710/119 |

FOREIGN PATENT DOCUMENTS

| | | | |
|---|---|---|---|
| 0 446 721 A2 | 3/1991 | (EP) | ............. G06F/12/06 |
| 0 525 985 A2 | 6/1992 | (EP) | ............. H04L/29/06 |

OTHER PUBLICATIONS

Tony R. Martinez, Smart memory architecture and methods, 1990, pp. 145–162, FGCS, vol. 6.
Pawate, et al., Memory Based Digital Signal Processing, Texas Instruments Inc. , 1990, IEEE, V3.4, pp. 41–44.

* cited by examiner

Primary Examiner—Gopal C. Ray
(74) Attorney, Agent, or Firm—Robby T. Holland; Carlton H. Hoel; Richard L. Donaldson

(57) ABSTRACT

Serial data processor (16) includes a digital processor (106) , a memory controller (114) interconnected with digital processor (106), and dynamic serial access memory (112) interconnected with memory controller(134) . First data selection circuit (134) sends serial data either from serial-data-in terminal (94), from dynamic serial access memory (112), or from digital processor (106) to second serial-data-in terminal (138), in response to a first control signal. Second data selection circuit (144) sends serial data either from serial-data-in terminal (138), from dynamic serial access memory (132) or from the digital processor to serial-data-out terminal (96), in response to a second control signal. A third data selection circuit (120) sends serial data either from serial-data-in terminal (94) , from dynamic serial access memory (112), or from the digital processor (90) to third serial-data-in terminal (150), in response to a third control signal. First, second and third data selection circuits (134, 144, 120) are multiplexers, each responsive to plural selection control signals. The first, second and third control signals each include plural selection control signals.

13 Claims, 2 Drawing Sheets

DATA COMMUNICATION INTERFACE INCLUDING AN INTEGRATED DATA PROCESSOR AND SERIAL MEMORY DEVICE

CROSS REFERENCE TO A RELATED PATENT APPLICATION

The following patent application is hereby incorporated into this application by reference: Ser. No. 07/934,955, filed Aug. 25, 1992 and entitled, "Method and Apparatus for Improved Processing" (TI-16770).

This is a Non Provisional application filed under 35 USC 119(e) and claims priority of prior provisional, Ser. No. 60/035,762 of inventor Earnest W. Powell, filed 01/06/97.

TECHNICAL FIELD OF THE INVENTION

This invention relates to an integrated digital processor and memory device and more specifically to a method and apparatus for serial data processing, including an integrated processor and serial memory device for uses including as an integral part of a data communication interface and digital audio system.

BACKGROUND OF THE INVENTION

Data processors are used for processing vast quantities of information very rapidly. Integrated circuit microprocessor technology improvements have progressively increased the processing speed of those devices. Generally a microprocessor and a separate integrated circuit random access memory device are combined into a microcomputer system as a practical operating arrangement. Integrated circuit random access memory devices generally fall into one of two categories.

One category of random access memory includes static storage cells. Such static random access memory (SRAM) devices are designed to operate at very fast speeds and can readily operate as fast as contemporary integrated circuit microprocessors. Although they operate fast enough to keep up with the microprocessor, the static random access memory devices are relatively expensive to produce. Their high cost causes microcomputer system designers to look for lower cost memory alternatives to minimize microcomputer system cost.

A second category of random access memory devices includes dynamic storage cells. Dynamic random access memory (DRAM) devices are designed to be very inexpensive by comparison to the cost of static random access memory devices. Although they have a very attractive low cost, dynamic random access memory devices generally operate significantly slower than the previously mentioned static random access memory devices. Their speed is slow enough that microcomputer system designers look for other devices and special arrangements to speed up the dynamic memory function so that the microcomputer system can operate at faster and faster speeds.

One recently proposed solution to the memory speed and cost trade-off is an arrangement known as a smart memory. A smart memory is an integrated circuit device that includes both a processing core and a memory array. The processing core is operable to execute instructions stored in the memory array and to communicate data with the memory array. External connections to the smart memory are arranged so that the smart memory functions as a standard random access memory device with respect to internal devices.

Known smart memory devices are limited in the types of paths through which data can flow within the device. Such limited types of data paths reduce the flexibility of accessing data within the smart memory devices and of processing that data and other data.

SUMMARY OF THE INVENTION

These and other problems are resolved by an integrated circuit serial data processor device that includes a digital processor, a memory controller interconnected with the digital processor, and a dynamic serial access memory interconnected with the memory controller. A first data selection circuit sends serial data from either a data-in terminal, the serial memory, or the digital processor to the serial memory. A second data selection circuit sends serial data from either the data-in terminal, the serial memory, or the digital signal processor to a data-out terminal.

A data communication interface includes a serial data source arranged with a first bus for carrying serial data to a data-in terminal of a serial data processor. A digital system is arranged with a second bus for carrying address signals, control signals, and data between the digital system and the serial data processor.

A digital audio processing system includes an audio medium arranged with a first bus for carrying serial data from the audio medium to a serial data-in terminal of a serial data processor. A controller is arranged with a second bus for carrying address signals, control signals, and serial data between the controller and the serial data processor and for carrying control signals to the audio medium. A conversion system is responsive to serial data from the serial data processor for producing audible sound.

BRIEF DESCRIPTION OF THE DRAWINGS

A better understanding of the invention may be derived by reading the subsequent detailed description of an illustrative embodiment of the invention with reference to the drawings wherein.

DETAILED DESCRIPTION OF THE INVENTION

Figure 1:
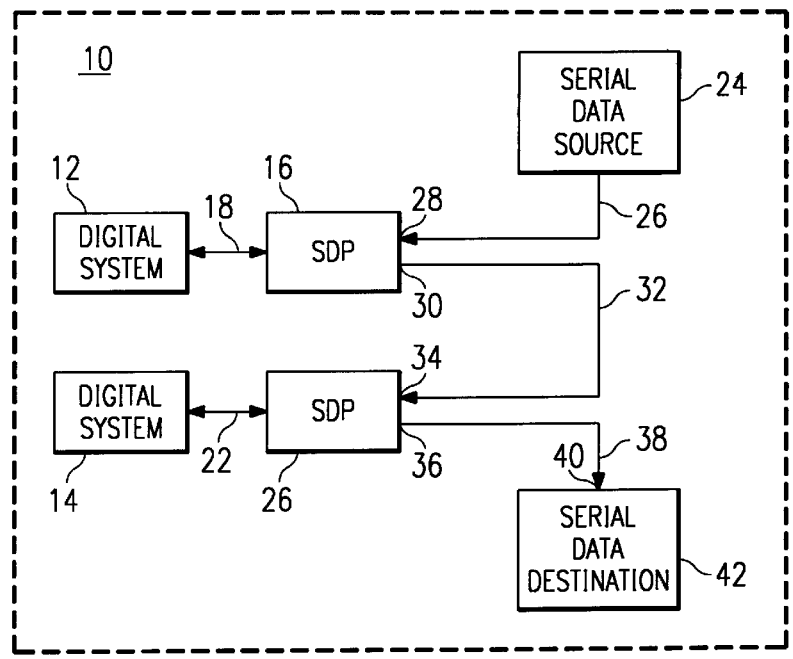
FIG. 1 is a block diagram of a data communications interface using a pair of host processors interconnected with serial data processors.

Referring now to FIG. 1, there is shown a block diagram of a data communications interface 10 that includes two digital systems 12 and 14. Serial data processor (SDP) 16 is interconnected by way of data bus 18 with the digital system 12. Bus 18 carries address signals from digital system 12 to SDP 16. Control signals and data are also carried by way of data bus 18 between digital system 12 and SDP 16. Similarly, another SDP 20 is interconnected by way of data bus 22 to digital system 14.

Digital systems 12 and 14 both are systems which may be arranged with memory, control circuits, data processing capability, and circuitry for interconnecting with peripheral devices, such as SDPs 16 and 20. Digital systems 12 and 14 may be printers, video cameras, computers, tape drives, computerized instrumentation, communication channels, or other circuits using serial data.

Each SDP 16 or 20 is arranged to function with respective digital system 12 or 14 like a peripheral circuit or a slave processor. Data may be written serially into either SDP 16 or 20 by the associated digital system 12 or 14 applying control signals, addresses, and data by way of data buses 18 and 22.

Serial data can be shifted into and out of each of the SDPs 16 and 20. Serial data source 24 is connected by way of bus 26 to serial data-in terminal 28 of SDP 16, for applying a serial sequence of data that is to be written into the SDP 16. Such a sequence of serial data may be stored within SDP 16 or else routed therethrough to serial data-out terminal 30 and another bus 32 which interconnects serial data-out terminal 30 with serial data-in terminal 34 of SDP 20. The sequence of serial data may be either stored in SDP 20 or else routed therethrough to serial data-out terminal 36. From serial data-out terminal 36, the sequence of serial data is conducted through data bus 38 and is applied to a serial data-in terminal 40 of serial data destination circuit 42. Serial data destination circuit 42 either receives and stores the sequence of serial data, operates on the data to form a picture on a visual display, controls a process, converts the data into sound, processes the data, or passes the data to another destination, not shown, or performs some other data processing function.

Figure 2:
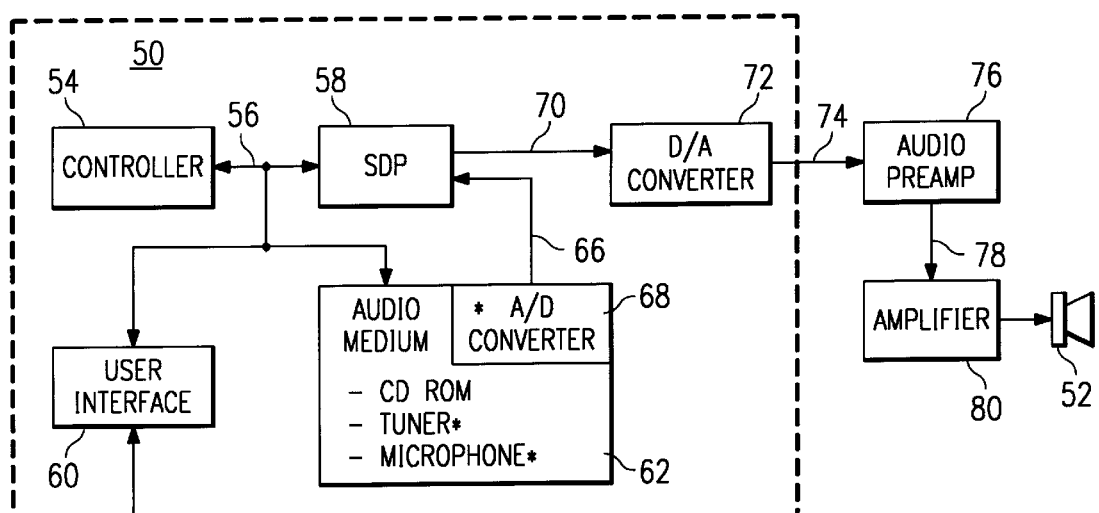
FIG. 2 is a block diagram of a digital audio processing system using a serial data processor with a controller.

Referring now to FIG. 2, there is shown a block diagram of digital audio processing system 50, which generates signals that are convertible to sound by a speaker 52. In digital audio processing system 50, controller 54 interconnects by way of data bus 56 with SDP 58, user interface circuit 60, and audio medium circuit 62 for the purpose of receiving user instructions and controlling SDP 58 and audio medium circuit 62. User 64 may apply digital instructions through user interface circuit 60 to data bus 56 and controller 54. SDP 58 receives digital data from audio medium circuit 62 by way of data bus 56 and processes such data in accordance with instructions received from controller 54 by way of data bus 56. For instance, controller 54 may send control signals by way of data bus 56 to audio medium circuit 62 for accessing analog signals from a tuner or a microphone, and for forwarding those analog signals to analog-to-digital (A/D) converter 68 for conversion into a digital signal representation of the analog signal. This digital signal representation thereafter is forwarded over data bus 66 to SDP 58 for storage or forwarding to another circuit. Alternatively, controller 54 may send instructions by way of data bus 56 to audio medium circuit 62 for accessing digital signals from a source, such as a CD-ROM system, and for forwarding those digital signals through data bus 66 to SDP 58. Thus, SDP 58 would receive serial data from a CD-ROM system of audio medium circuit 62, or from A/D converter circuit 68.

Depending upon control signals applied from controller 54, SDP 58 can read out and send data through data bus 70 to a conversion system. In response to the serial data, a digital-to-analog (D/A) converter circuit 72 converts the digital data output of SDP 58 to analog signals in an audible range of frequencies. Output analog signals from the D/A converter circuit 72 are transmitted through circuit path 74 to audio preamplifier 76 for preamplifying the analog signals. Preamplified analog signals are further transmitted through path 78 and audio amplifier 100 to speaker 52 for conversion to audible sound.

Figure 3:
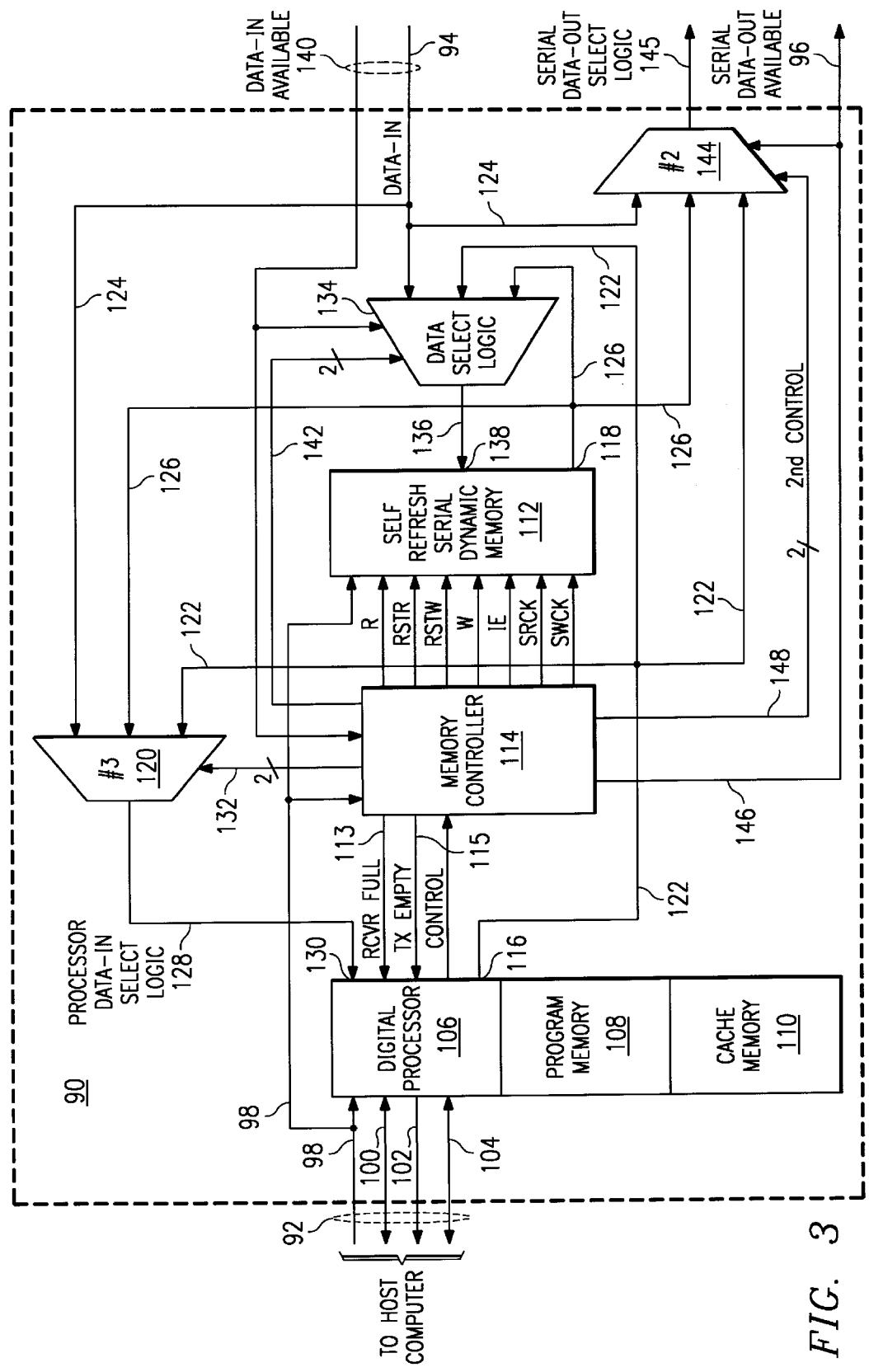
FIG. 3 is a block diagram of a serial data processor, in accordance with the present invention.

Referring now to FIG. 3, there is shown a block diagram of SDP 90, which may be used in the block diagram of FIG. 1 for SDPs 16 and 20 and in the block diagram of FIG. 2 for SDP 58. In SDP 90 of FIG. 3, random access port 92 receives and transmits communication with a digital system, such as digital system 12 or 14 of FIG. 1 or with a controller, such as controller 54 of FIG. 2. Additionally, serial data-in terminal 94 receives serial data from a serial data source, such as serial data source 24 or SDP 16 of FIG. 1 or audio medium circuit 62 of FIG. 2. Serial data-out terminal 96 communicates data to a serial data receiver, such as SDP 20 or serial data destination circuit 42 of FIG. 1, or D/A converter circuit 72 of FIG. 2.

Random access port 92 includes a clock lead 98, control bus 100, address bus 102, and data bus 104 for interconnecting with host computer, such as digital system 12 or 14 of FIG. 1 or with controller 54 of FIG. 2.

Within SDP 90, clock lead 98, control bus 100, address bus 102, and data bus 104 interconnect with data processor 106 for transmitting signals between the host processor and data processor 106. Associated with data processor 106 is a memory arrangement that provides a suitable program and fast access to data. For example, FIG. 3 shows a program memory 108, which may be read only memory (ROM) or erasable-programmable read only memory (EPROM), and cache memory 110, which may be, for example, a static random access memory (SRAM).

Self-refresh, serial dynamic memory 112 also associates with data processor 106 for storing serial sequences of data to be processed, providing a serial memory data-in terminal and a serial output, which are described in more detail subsequently herein.

Memory controller 114 is interposed between data processor 106 and self-refresh, serial dynamic memory 112 for producing a plurality of control signals for the self-refresh until the serial receiver circuit is at least partially unloaded and the receiver full signal 113 (RCVR FL) is inactivated. Somewhat similarly when active, the transmitter empty signal 115 (TX EMTY) indicates to data processor 106 that a serial transmitter circuit (not shown) in self-refresh, serial dynamic memory 112 is empty and has no serial data to be transmitted. When the serial transmitter circuit is at least partially refilled, the transmitter empty signal 115 (TX EMTY) is inactivated.

Data processor 106 also processes serial data from multiple serial data sources. These multiple serial data sources include processor serial data output 116, serial data-in terminal 94, and serial output 118 from self-refresh, serial dynamic memory 112. The three serial data sources are applied as inputs to three different data selection logic circuits.

Processor data-in select logic circuit 120 receives serial data from the three serial data sources (122, 124 and 126) and selects one of them at a time for transmission by way of lead 128 to serial data-in terminal 130 of data processor 106. Lead 122 carries serial data from processor serial data output 116 to an input of processor data-in selection logic circuit 120. Lead 124 carries serial data from serial data-in terminal 94 to a second input of processor data-in selection logic circuit 120. Also, lead 126 carries serial data from serial output 118 of self-refresh serial dynamic memory 112 to a third input of processor data-in selection logic circuit 120. There need not be specific enabling control signal for turning on and off processor data-in selection logic circuit 120. Memory controller 114 supplies a selection control signal by way of lead pair 132 to processor data-in select logic circuit 120. The selection control signal includes a two-bit code for making a 1-out-of-3 selection from the serial data inputs that may be transmitted out of processor data-in select logic circuit 120.

Memory serial-data-in selection logic circuit 134 receives serial data from three serial data sources (94, 122 and 126) and selects one of them at a time for transmission, by way of a lead 136, to memory data-in terminal 138 of the self-refresh serial dynamic memory 112. Lead 122 carries serial data from processor serial data output 116 to an input of memory serial-data-in-selection logic circuit 134. Lead 124 carries serial data from the serial-data-in terminal 94 to a second input of the memory serial-data-in selection logic circuit 134. Also, lead 126 carries serial data from serial output 118 of the self-refresh serial dynamic memory 112 to a third input of the memory serial-data-in selection logic circuit 134. A data-in available control signal is applied from an external circuit through lead 140 to enable memory serial-data-in selection logic circuit 134 when serial data is available from the external circuit and to disable memory serial-data-in selection logic circuit 134 when serial data is not available from the external circuit. The date-in available control signal is also applied to memory controller 114 as one of the inputs for generating the memory controller outputs. Memory controller 114 supplies another selection control signal by way of lead pair 142 to memory serial-data-in selection logic circuit 134. This selection control signal includes a two-bit code for making a 1-out-of-3 selection among the serial data inputs to be transmitted out of memory serial-data-in selection logic circuit 134.

The data-in available control signal on the lead 140 is applied to the memory controller 114 as well as the memory serial-data-in selection logic circuit 134. This control signal on lead 140 tells memory controller 114 when serial data is available from the external circuit providing serial data by way of the data-input lead 94. Once memory controller 114 knows serial data is available on serial data-in terminal 94, the controller decides whether or not and when to accept that data into SDP 90. Additionally, once the controller decides to accept the serial data on serial data-in terminal 94, memory controller 114 further decides whether to forward that data either to self-refresh serial dynamic memory 112, data processor 106, or serial data-output lead 96. Appropriate serial data selection control signals are then produced and applied to the three data selection logic circuits 120, 134 and 144.

Serial-data-output selection logic circuit 144 receives serial data from the three serial data sources and selects one of them at a time for transmission, by way of a lead 146, to data-out terminal 96. Lead 122 carries the serial data from processor serial data output 116 to an input of memory serial-data-output selection logic circuit 144. Lead 124 carries the signal from serial-data-in terminal 94 to serial-data-output selection logic circuit 144. Lead 126 carries serial data from serial output 118 to memory serial-data-out selection circuit 144. A data-out available control signal is applied by memory controller 114 through a lead 96 to enable the serial-data-output selection logic circuit 144 when serial data is available from self-refresh serial dynamic memory 112 or from data processor 106. Memory controller 114 supplies a third selection control signal by way of lead pair 148 to the serial-data-out selection logic circuit 144. This third selection control signal includes a two-bit code for making a 1-out-of-3 selection among the serial data inputs to be transmitted out of the serial-data-output selection logic circuit 144.

The SDP is capable of simultaneously processing data in many ways as determined by the three data selection logics 120, 134, and 144 under control of memory controller 114 and digital processor 106. The following operations are described with respect to SDP data paths and may occur in various combinations to implement different application requirements.

Serial DATA-In can be input to the self-refresh serial DRAM 112 for storage and/or input to digital processor 106 for immediate processing and/or immediately transmitted out of the SDP via serial data-out select logic 144.

Data-out 116 from the digital processor 106 can be immediately returned to the digital processor 106 by way of the processor data-in select logic 120 and/or input to the self-refresh serial dynamic ram 112 for storage by way of data select logic 134 and/or transmitted out of the SDP by way of serial data-out select logic 144.

Serial data-out from terminal 118 of the self-refresh serial DRAM 112 can be immediately returned to the self-refresh serial DRAM 112 by way of data select logic 134 and/or sent to digital process 106 by way of data select logic 120 and/or transmitted out of the SDP at serial data-out terminal 96 by way of serial data-out select logic 144 at output level 145.

Although the invention has been described in detail herein with reference to the illustrative embodiments, it is to be understood that this description is by way of example only and is not to be construed in a limiting sense. It is to be further understood, therefore, that numerous changes in the details of the embodiments of the invention and additional embodiments of the invention, will be apparent to, and may be made by, persons of ordinary skill in the art having reference to this description. It is contemplated that all such changes and additional embodiments are within the spirit and true scope of the invention as claimed below.

What is claimed is:

1. A digital audio processing system comprising:

an audio medium and a user interface;

a serial data processor having a serial data-in terminal;

a first bus arranged for communicating serial data from the audio medium with the serial data-in terminal;

a controller;

a second bus arranged for communicating address signals, control signals, and serial data with the controller and the serial data processor and for communicating control signals with the audio medium, and for communicating control signals with the user interface; and a conversion system, responsive to serial data from a serial data-out terminal of the serial data processor, for producing audible sound.

2. A digital audio processing system, in accordance with claim 1, wherein:

the audio medium includes a compact disc read-only memory.

3. A digital audio processing system, in accordance with claim 1, wherein:

the audio medium includes a tuner producing an analog signal; and an analog-to-digital converter, responsive to the analog signal, for producing the serial data at the serial data-out terminal.

4. A digital audio processing system, in accordance with claim 1, wherein:

the audio medium includes a microphone producing an analog signal; and an analog-to-digital converter, responsive to the analog signal, for producing the serial data at the serial data-out terminal.

5. A digital audio processing system, in accordance with claim 1, wherein:

the audio medium includes a transducer producing an analog signal; and an analog-to-digital converter, responsive to the analog signal, for producing the serial data at the serial data-out terminal.

6. An integrated circuit device comprising:

a digital processor;

a memory controller interconnected with the digital processor;

a dynamic serial access memory, interconnected with the memory controller and arranged with a serial-data-in terminal and a serial-data-out terminal;

first and second data selection circuits;

the first data selection circuit, responsive to a first control signal, for sending serial data either from a first external circuit, from the serial-data-out terminal, or from the digital processor to the serial-data-in terminal; and the second data selection circuit, responsive to a second control signal, for sending serial data either from the first external circuit, from the serial-data-out terminal, or from the digital processor to a second external circuit.

7. An integrated circuit device, in accordance with claim 6, wherein:

the memory controller is arranged for producing the first and second control signals;

a first lead is arranged for applying an external data-in available signal to the first data selection circuit to initiate a transfer of data through the first data selection circuit to the serial data-in terminal; and a second lead is arranged for applying a data-out available signal from the memory controller to the second data selection circuit and enabling the second data selection circuit to initiate a transfer of data through the second data selection circuit to the second external circuit.

8. An integrated circuit device, in accordance with claim 6, wherein:

the first and second data selection circuits are multiplexers having plural selection control terminals, and the first and second control signals each include plural signals.

9. An integrated circuit device, comprising:

a digital processor;

a memory controller interconnected with the digital processor;

a dynamic serial access memory, interconnected with the memory controller and arranged with a serial-data-in terminal and a serial-data-out terminal;

first and second data selection circuits;

the first data selection circuit, responsive to a first control signal, for sending serial data either from a first external circuit, from the serial-data-out terminal, or from the digital processor to the digital processor; and the second data selection circuit, responsive to a second control signal, for sending serial data either from the first external circuit, from the serial-data-out terminal, or from the digital processor to a second external circuit.

10. An integrated circuit device, in accordance with claim 9, wherein, the memory controller is arranged for producing the first and second control signals;

a first lead is arranged for applying an external data-in available signal to the first data selection circuit, and enabling the first data selection circuit to initiate a transfer of data through the first data selection circuit to the digital processor; and a second lead is arranged for applying a data-out available signal from the memory controller to the second data selection circuit and enabling the second data selection circuit to initiate a transfer of data through the second data selection circuit to the second external circuit.

11. An integrated circuit device comprising:

a digital processor;

a memory controller interconnected with the digital processor;

a dynamic serial access memory, interconnected with the memory controller and arranged with a serial-data-in terminal and a serial-data-out terminal;

first, second and third data selection circuits;

the first data selection circuit, responsive to a first control signal, for sending serial data either from a first external circuit, from the serial-data-out terminal, or from the digital processor to the serial-data-in terminal;

the second data selection circuit, responsive to a second control signal, for sending serial data either from the first external circuit, from the serial-data-out terminal, or from the digital processor to a second external circuit; and the third data selection circuit, responsive to a third control signal, for sending serial data either from the first external circuit, from the serial-data-out terminal, or from the digital processor to the digital processor.

12. An integrated circuit device, in accordance with claim 1, wherein:

the memory controller is arranged for producing the first, second and third control signals; a first lead is arranged for applying an external data-in available signal to the first data selection circuit and the memory controller and enabling the first data selection circuit to initiate a transfer of data through the first data selection circuit to the data-in terminal;

a second lead is arranged for applying the external data-in available signal to the memory controller for producing a signal to initiate a transfer of data through the second data selection circuit to the processor; and a third lead is arranged for applying a data-out available signal from the memory controller to the third data selection circuit to initiate a transfer of data through the third data selection circuit to the second external circuit.

13. An integrated circuit device, in accordance with claim 11, wherein:

the first, second, and third data selection circuits are multiplexers having plural selection control terminals, and the first, second and third control signals each include plural signals.

* * * * *

UNITED STATES PATENT AND TRADEMARK OFFICE
CERTIFICATE OF CORRECTION

PATENT NO. : 6,178,476 B1
DATED : 01/23/2001
INVENTOR(S) : Earnest W. Powell

It is certified that error appears in the above-identified patent and that said Letters Patent is hereby corrected as shown below:

ON THE TITLE PAGE
--[75] Inventor : should read -- Earnest W. Powell --

Signed and Sealed this

Fifteenth Day of May, 2001

Attest:

NICHOLAS P. GODICI

*Attesting Officer*  *Acting Director of the United States Patent and Trademark Office*